(12) United States Patent
Goto (10) Patent No.: US 10,178,551 B2
(45) Date of Patent: Jan. 8, 2019

(54) COMMUNICATION APPARATUS CONFIGURED TO PERFORM PROCESS FOR SHARING COMMUNICATION PARAMETER WITH ANOTHER COMMUNICATION APPARATUS

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 15/210,706

(22) Filed: Jul. 14, 2016

(65) Prior Publication Data
US 2017/0026833 A1 Jan. 26, 2017

(30) Foreign Application Priority Data
Jul. 21, 2015 (JP) .................................. 2015-144397

(51) Int. Cl.
| | |
|---|---|
| *H04W 12/06* | (2009.01) |
| *H04W 16/18* | (2009.01) |
| *H04W 12/04* | (2009.01) |
| *H04W 4/80* | (2018.01) |
| *H04W 8/00* | (2009.01) |
| *H04W 84/12* | (2009.01) |

(52) U.S. Cl.
CPC ............ *H04W 12/06* (2013.01); *H04W 4/80* (2018.02); *H04W 12/04* (2013.01); *H04W 16/18* (2013.01); *H04W 8/005* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2006/0208088 A1* | 9/2006 | Sekiguchi | ............ G06K 7/1095 235/472.02 |
| 2013/0223279 A1* | 8/2013 | Tinnakornsrisuphap | .................... H04L 41/0809 370/254 |
| 2014/0269646 A1* | 9/2014 | Ramasamy | ........... H04W 76/14 370/338 |

* cited by examiner

*Primary Examiner* — Henry Tsang
(74) *Attorney, Agent, or Firm* — Canon U.S.A., Inc. IP Division (57) ABSTRACT

A communication apparatus includes a first notification unit, a second notification unit, a reception unit, and a sharing unit. The first notification unit provides first information containing information unique to the communication apparatus and information on a predetermined channel for use in sharing a communication parameter for wireless communication with a different communication apparatus. The second notification unit provides second information containing the information unique to the communication apparatus but not containing information on the predetermined channel. When the first information is provided, the reception unit waits to receive a predetermined signal containing information corresponding to the information unique to the communication apparatus without shifting to another channel. When the second information is provided, the reception unit waits to receive the predetermined signal using a plurality of channels. When the predetermined signal is provided, the sharing unit shares the communication parameter with the different communication apparatus.

18 Claims, 6 Drawing Sheets

FIG. 6

COMMUNICATION APPARATUS CONFIGURED TO PERFORM PROCESS FOR SHARING COMMUNICATION PARAMETER WITH ANOTHER COMMUNICATION APPARATUS

BACKGROUND

Field

Aspects of the present invention generally relate to a technique for sharing communication parameters.

Description of the Related Art

In order for a communication apparatus to communicate with an access point by radio, the communication apparatus needs to set various communication parameters, such as an encryption method, an encryption key, an authentication method, and an authentication key. An example of a technique for setting such communication parameters is disclosed in U.S. Patent Application Publication No. 2006/0208088. In the technique disclosed in U.S. Patent Application Publication No. 2006/0208088, the access point displays a two-dimensional code containing information on the communication parameters. A communication apparatus captures an image of the two-dimensional code displayed on the access point and decodes the two-dimensional code to set the communication parameters.

However, if the two-dimensional code containing information on communication parameters is displayed, as in U.S. Patent Application Publication No. 2006/0208088, the communication parameters could be acquired by an unintended apparatus. A conceivable method for preventing this from occurring would be for the communication apparatus to display, not a QR Code® containing information on the communication parameters, but information on an encryption key that encrypts the communication parameters in the QR Code®, while a different apparatus that has acquired the encryption key encrypts the communication parameters using the encryption key and provides the communication parameters to the communication apparatus by wireless communication.

In this case, in order that the different communication apparatus can provide the communication parameters to the communication apparatus by wireless communication, the communication apparatus and the different apparatus need to communicate with each other over the same channel. The communication apparatus therefore needs to search for a channel that the different apparatus uses.

This results in a significant time delay to share the communication parameters.

SUMMARY

According to an aspect of the present invention, a communication apparatus includes a first notification unit, a second notification unit, a reception unit, and a sharing unit. The first notification unit is configured to provide a notification of first information containing information unique to the communication apparatus and information on a predetermined channel for use in sharing a communication parameter for wireless communication with a different communication apparatus. The second notification unit is configured to provide a notification of second information containing the information unique to the communication apparatus but not containing information on the predetermined channel. The reception unit is configured to, when the first information is provided, wait to receive a predetermined signal containing information corresponding to the information unique to the communication apparatus without shifting from the predetermined channel to another channel and configured to, when the second information is provided, wait to receive the predetermined signal from the different communication apparatus using a plurality of channels. The sharing unit is configured to, when the reception unit receives the predetermined signal from the different communication apparatus, perform a process for sharing the communication parameter with the different communication apparatus.

Further features of aspects of the present invention will become apparent from the following description of exemplary embodiments with reference to the attached drawings.

DESCRIPTION OF THE EMBODIMENTS

A communication apparatus according to an embodiment of the present invention will be described hereinbelow with reference to the drawings. The following is an example in which a wireless LAN system based on the Institute of Electrical and Electronics Engineers, Inc. (IEEE) 802.11 series is used. This is provided for mere illustration purposes, and aspects of the present invention are applicable to a communication apparatus based on other wireless communication methods, such as Bluetooth® and ZigBee. Aspects of the present invention are also applicable to a communication apparatus based on a wired communication method, such as wired LAN.

Figure 3:
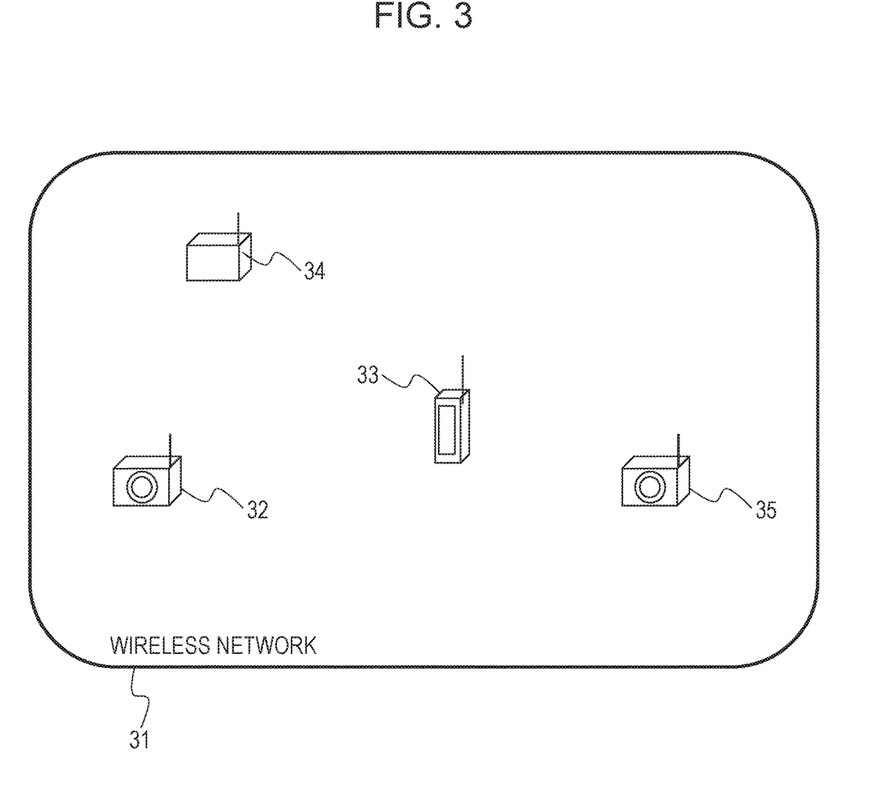
FIG. 3 is a diagram illustrating a communication system according to an embodiment of the present invention.

FIG. 3 illustrates a communication system according to this embodiment. The communication system illustrated in FIG. 3 includes communication apparatuses, such as a first camera 32, a smartphone 33, an access point (hereinafter referred to as "AP") 34, and a second camera 35. A wireless network 31 is a wireless network that the AP 34 forms.

Other examples of the communication apparatus includes, in addition to cameras and smartphones, various image capturing apparatuses, such as a video camera, and image input apparatuses, such as a scanner. Still other examples include image output apparatuses, such as a printer, a copying machine, and a projector. Still other examples include storage devices, such as a hard disk and a memory, and various information processing apparatuses, such as a personal computer (PC) and a mobile phone.

In this embodiment, the AP 34 operates as an access point in an infrastructure mode defined by the IEEE 802.11 standard. In other words, the AP 34 operates as a base station that establishes a wireless network and transmits a beacon at predetermined regular intervals. The AP 34 can be a Group Owner (GO) having a function corresponding to an AP in Wi-Fi Direct® defined by Wi-Fi Alliance®. The GO also establishes a wireless network, as the AP does, and operates as a base station that transmits a beacon.

The other communication apparatuses operate as stations (STAs) in the infrastructure mode defined by the IEEE 802.11 standard. The first camera 32, the smartphone 33, and the second camera 35 join the wireless network 31 that the AP 34 forms to wirelessly communicate with one another via the AP 34.

Figure 1:
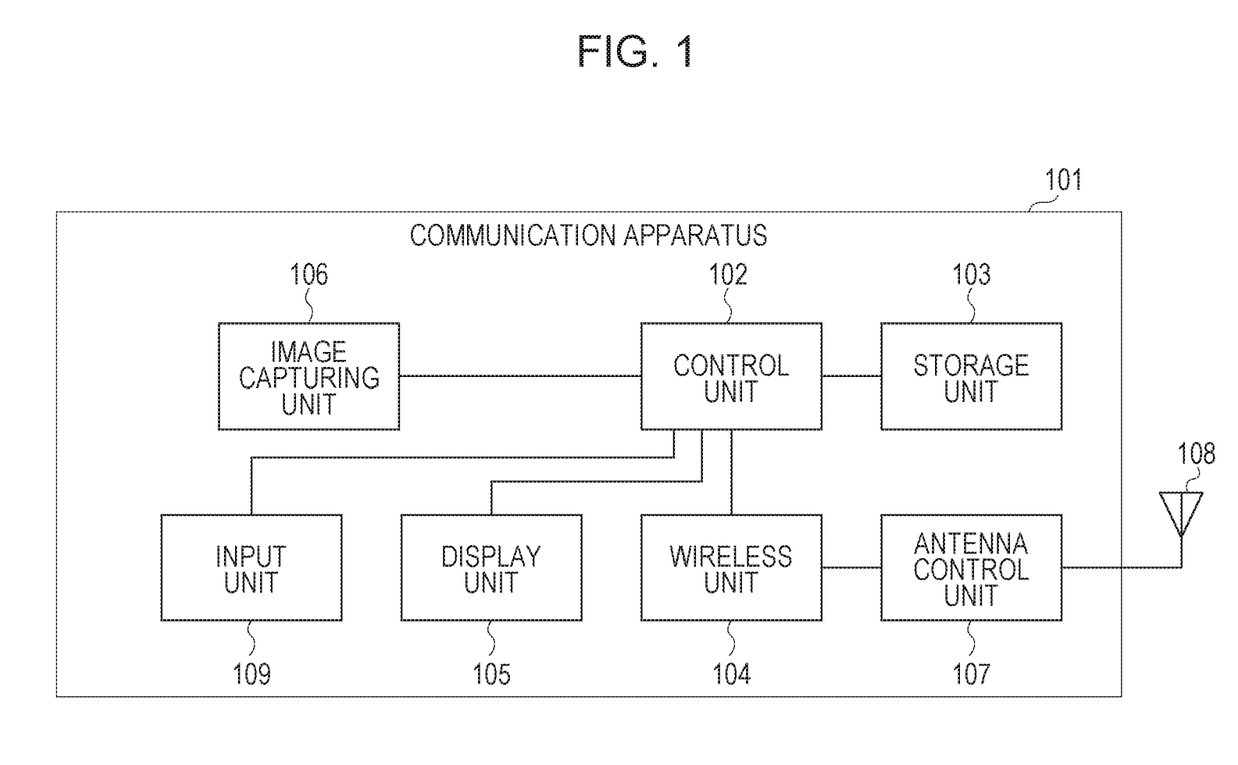
FIG. 1 is a diagram illustrating the hardware configuration of a communication apparatus according to an embodiment of the present invention.

Referring next to FIG. 1, the hardware configuration of each communication apparatus of the communication system shown in FIG. 3 will be described. FIG. 1 illustrates the whole of a communication apparatus 101. A control unit 102 is used to control the whole of the communication apparatus 101 by implementing a control program stored in a storage unit 103. Examples of the control unit 102 include a CPU and a microprocessor unit (MPU), which control the whole of the communication apparatus 101 by implementing the program stored in the storage unit 103. The entire communication apparatus 101 can be controlled in cooperation with an operating system (OS) that the control unit 102 runs.

The storage unit 103 stores the control program that control unit 102 executes, image data, and various pieces of information, such as communication parameters. The various operations described later are performed by the control unit 102 executing the control program stored in the storage unit 103. Examples of the storage unit 103 include a read-only memory (ROM), a random-access memory (RAM), a hard disk drive (HDD), a flash memory, and a detachable SD card.

A wireless unit 104 is used to perform wireless LAN communication based on the IEEE 802.11 series. The wireless unit 104 is formed of a wireless communication chip. A display unit 105 gives various displays and is capable of outputting visually recognizable information, like a liquid crystal display (LCD) and a light-emitting diode (LED), and outputting audio, like a speaker. The display unit 105 is capable of outputting at least one of visual information and audio information. For visual information, the display unit 105 includes a video RAM (VRAM) that holds image data corresponding to the visual information to be displayed. The display unit 105 performs such display control as to continuously display image data stored in the VRAM on a LCD or an LED.

An image capturing unit 106 includes an image sensor and a lens and captures still images or moving images. The image capturing unit 106 captures an image of a QR Code®, for example. Although this embodiment shows an example in which a QR Code® is used. In some embodiments, another barcode, such as a two-dimensional code, is used.

An antenna control unit 107 is used to control the output of an antenna 108. The antenna 108 is capable of communication in 2.4 GHz band and 5 GHz band for wireless LAN communication. An input unit 109 is used for the user to do various inputs to operate the communication apparatus 101. The input unit 109 stores information corresponding to the inputs in a memory, such as the storage unit 103.

FIG. 1 illustrates a mere example, and the communication apparatus 101 can have another hardware configuration. If the communication apparatus 101 is a printer, the communication apparatus 101 can include a printing unit in addition to the configuration shown in FIG. 1. If the communication apparatus 101 is the AP 34, the image capturing unit 106 is not needed.

Figure 2:
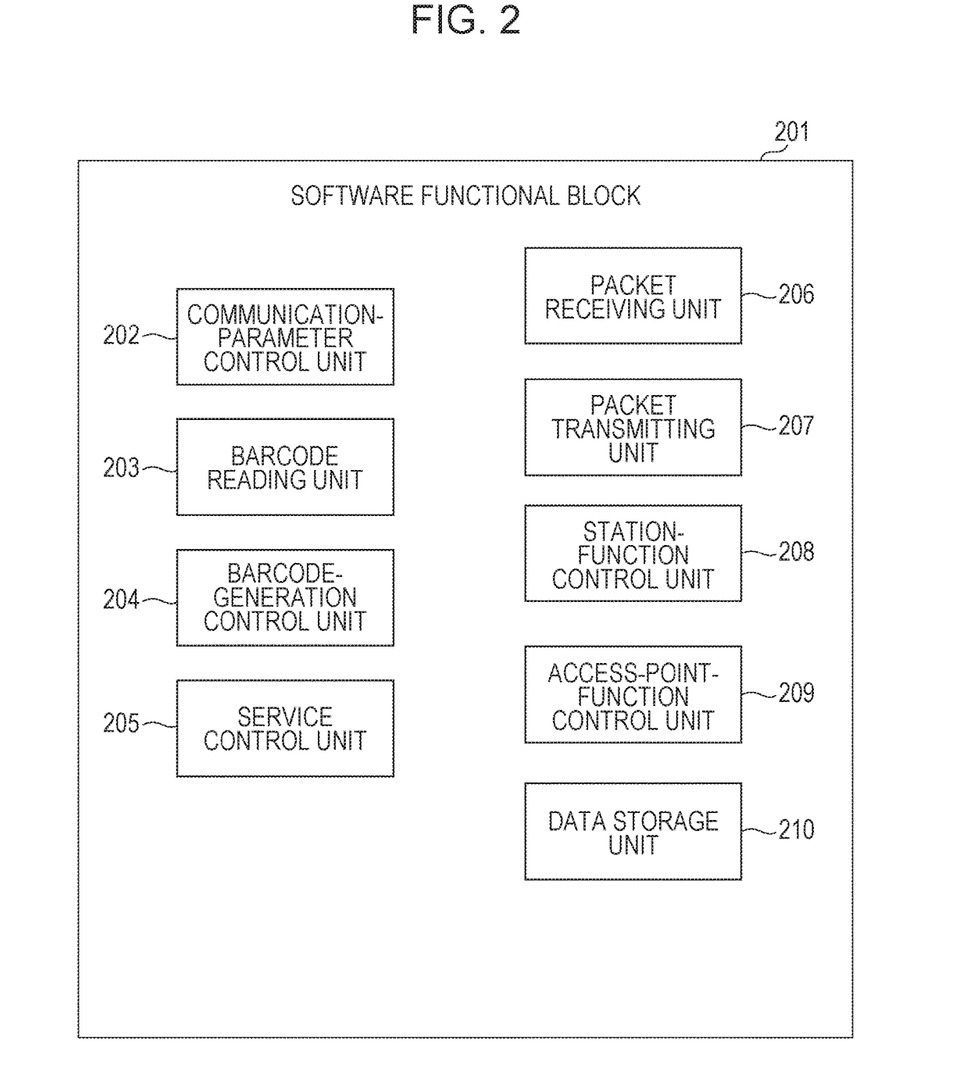
FIG. 2 is a diagram illustrating the software functional block of a communication apparatus according to an embodiment of the present invention.

FIG. 2 illustrates a software functional block 201 implemented by the control unit 102 of the communication apparatus 101 reading a program stored in the storage unit 103. At least part of the software functional block 201 illustrated in FIG. 2 can be implemented by hardware. With the hardware, a predetermined compiler is used to generate a dedicated circuit on a field programmable gate array (FPGA) from a program for implementing each function. The generated dedicated circuit can be used as a hardware module having the function of the software module. A gate array circuit can be formed, as the FPGA is, and can be implemented as hardware.

A communication-parameter control unit 202 performs a communication-parameter sharing process for sharing communication parameters among the communication apparatuses 101. In the communication-parameter sharing process, a providing apparatus provides communication parameters for wireless communication to a receiving apparatus. Examples of the communication parameters include wireless communication parameters necessary for wireless communication, such as a service set identifier (SSID), which is a network identifier, an encryption method, an encryption key, an authentication method, and an authentication key. Another example is a media access control (MAC) address, which is identification information unique to the communication apparatus. Still other examples are a passphrase, an IP address for communication in an internet protocol (IP) layer, and information necessary for higher-level service. The communication-parameter control unit 202 communicates communication parameters encrypted using an encryption key, which is shared in advance using a public key, to share the communication parameters among the communication apparatuses 101. This is provided for mere illustration purposes, and the communication-parameter control unit 202 can share the communication parameters by performing communication according to a procedure based on Wi-Fi® protected setup (WPS) defined by Wi-Fi Alliance® or Wi-Fi Direct®.

A barcode reading unit 203 is used to analyze an image of a barcode, a two-dimensional code, or a QR Code® captured by the image capturing unit 106 to acquire coded information.

A barcode-generation control unit 204 is used for control for generating a barcode, a two-dimensional code, or a QR Code® and for displaying the generated barcode, two-dimensional code, or QR Code® on the display unit 105. A service control unit 205 is in an application layer. The application layer here refers to a service providing layer in an upper layer equal to or higher than the fifth layer in an open systems interconnection (OSI) reference model. In other words, the service control unit 205 executes a printing process, an image streaming process, a file transferring process, and so on by wireless communication using the wireless unit 104.

A packet receiving unit 206 and a packet transmitting unit 207 respectively control reception and transmission of all packets including a communication protocol in an upper layer. The packet receiving unit 206 and the packet transmitting unit 207 control the wireless unit 104 to receive and transmit packets from/to a different apparatus on the basis of the IEEE 802.11 standard.

A station (STA)-function control unit 208 provides a STA function that operates as a station (STA) in the infrastructure mode defined by the IEEE 802.11 standard. The STA-function control unit 208 executes authentication and encryption processing and so on when operating as a STA. An access point (AP)-function control unit 209 provides an AP function that operates as an access point (AP) in the infrastructure mode defined by the IEEE 802.11 standard. The AP-point control unit 209 forms a wireless network and performs authentication and encryption processing on the STA and manages the STA. A data storage unit 210 controls writing and reading of software, communication parameters, and information, such as a barcode, in and from the storage unit 103.

The above functional block is provided for mere illustration purposes, and a plurality of functional blocks can constitute a single functional block, or one of the functional blocks can be divided into blocks for a plurality of functions. If the communication apparatus 101 is the AP 34, the STA-function control unit 208 is not needed. If the communication apparatus 101 is the first camera 32, the second camera 35, or the smartphone 33, which is operated as a STA, the AP-point control unit 209 is not needed.

The operation of the communication system with the above configuration will be described. First, to set the wireless network 31, setting of the AP 34 is performed using the smartphone 33. Then, a setting process for allowing the first camera 32 and the second camera 35 to join the network of the AP 34 is performed using the smartphone 33.

Figure 5:
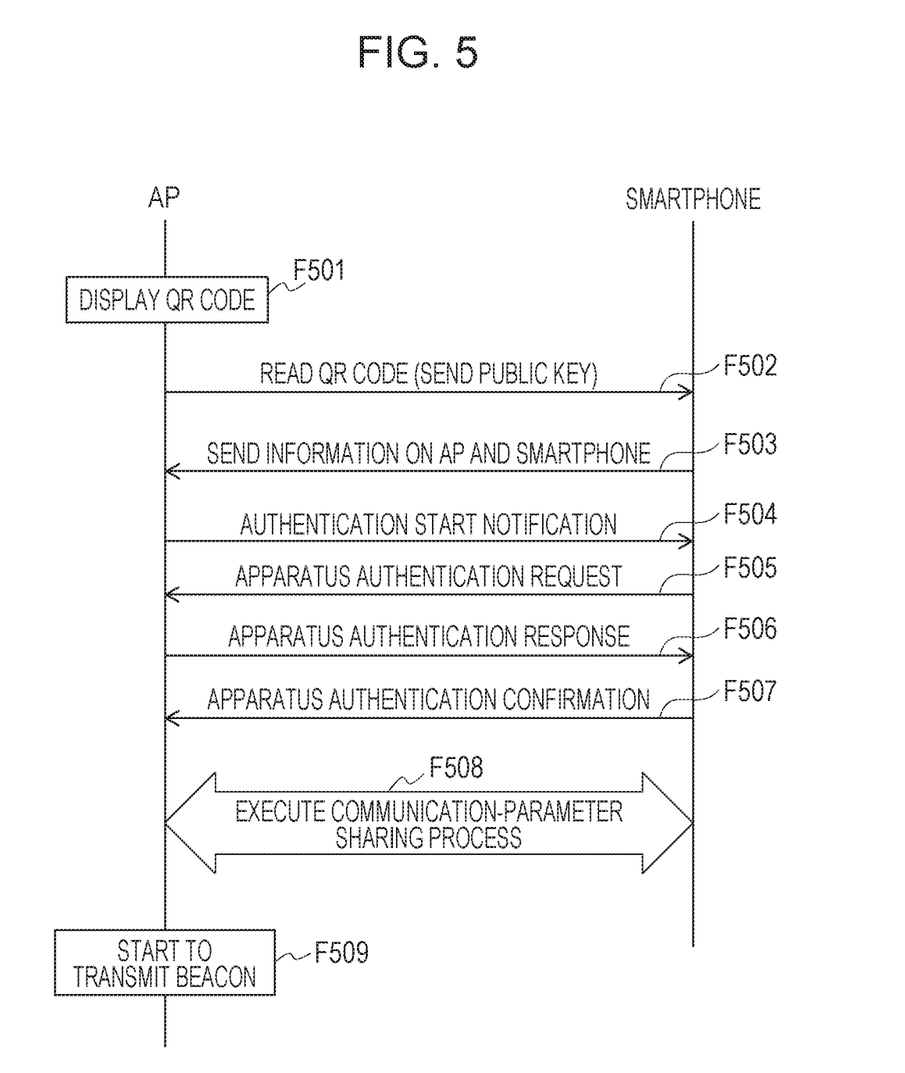
FIG. 5 is a flowchart illustrating a sequence for connecting communication apparatuses according to an embodiment of the present invention.

FIG. 5 illustrates a sequence for connecting the smartphone 33 and the AP 34 during setting processing. In FIG. 5, the smartphone 33 provides information for establishing the wireless network 31 to the AP 34.

The AP 34 displays a QR Code® containing information necessary for setting communication parameters on the display unit 105 of the AP 34 according to a user operation. When the AP 34 is instructed by the user to set communication parameters, the AP 34 displays a QR Code® containing information necessary for setting the communication parameters on the display unit 105 (F501).

The information necessary for setting communication parameters is identification information unique to the AP 34. The identification information is a public key or a certificate for use in encryption to share the communication parameters. The identification information can be a MAC address or a universally unique identifier (UUID) that uniquely identifies a network device. The information necessary for setting the communication parameters can include an identifier indicating that the apparatus is a receiving apparatus that receives the communication parameters. The information necessary for setting the communication parameters can include identification information, such as a one type password using a QR Code®.

The smartphone 33 reads the QR Code® displayed on the AP 34 using the image capturing unit 106 of the smartphone 33 (F502). The smartphone 33 decodes the read QR Code® to acquire information that the QR Code® indicates. The smartphone 33 determines whether the information acquired from the QR Code® is information necessary for setting the communication parameters.

In this embodiment, a QR Code® containing information necessary for setting communication parameters is displayed. The information can be provided using near-field communication (NFC). In other words, the information necessary for setting the communication parameters can be contained in the tag information of the NFC, and the information can be read using an NFC reader writer of a different apparatus. Instead of the NFC, Action Frame defined by Wi-Fi Alliance® or Bluetooth® communication can be used to provide the information. Alternatively, wireless communication based on IEEE 802.11ad or Transfer-Jet® can be used. The information can be provided by wired communication over a cable, such as a universal serial bus (USB) and Ethernet®.

The smartphone 33 that has acquired the public key or the like of the AP 34 serves as a communication-parameter providing apparatus and transmits a notification signal containing information corresponding to the identification information on the AP 34 to the AP 34 together with information on the smartphone 33 (F503). An example of the information corresponding to the identification information on the AP 34 is a hash value of the identification information, such as the public key of the AP 34.

The AP 34 that has acquired the information on the smartphone 33, which is a communication parameter providing apparatus, starts an apparatus authentication process. The AP 34 transmits a start request signal for starting the authentication process to the smartphone 33 (F504).

In response to receiving the apparatus-authentication start request signal from the AP 34, the smartphone 33 transmits an apparatus-authentication request signal to the AP 34 (F505).

Upon receiving the apparatus-authentication request signal, the AP 34 returns an apparatus-authentication response signal to the smartphone 33 (F506). Upon receiving the apparatus-authentication response signal, if authentication is completed, the smartphone 33 returns an apparatus-authentication confirmation signal to the AP 34 (F507). For the apparatus authentication executed from F505 to F507, a challenge response method is employed. This is provided for mere illustration purposes, and another authentication method can be employed.

Then, a communication-parameter sharing process is executed between the AP 34 and the smartphone 33 (F508). The communication-parameter sharing process at F508 is based on WPS developed by Wi-Fi Alliance®. The communication-parameter sharing process can be based on, not the WPS, but Wi-Fi Direct® or AOSS. In this case, the communication parameters are provided from the smartphone 33 to the AP 34. The AP 34 starts to transmit a beacon using the set communication parameters (F509).

The AP 34 can establish the wireless network 31 according to the above connection sequence. For apparatus authentication, an example is described in which the AP 34 transmits an apparatus-authentication start notification to request the smartphone 33 to submit an apparatus authentication request. This is provided for mere illustration purposes, and F503 and F504 can be omitted, and the smartphone 33 can transmit the apparatus authentication request to the AP 34 immediately after reading the QR Code®.

Figure 6:
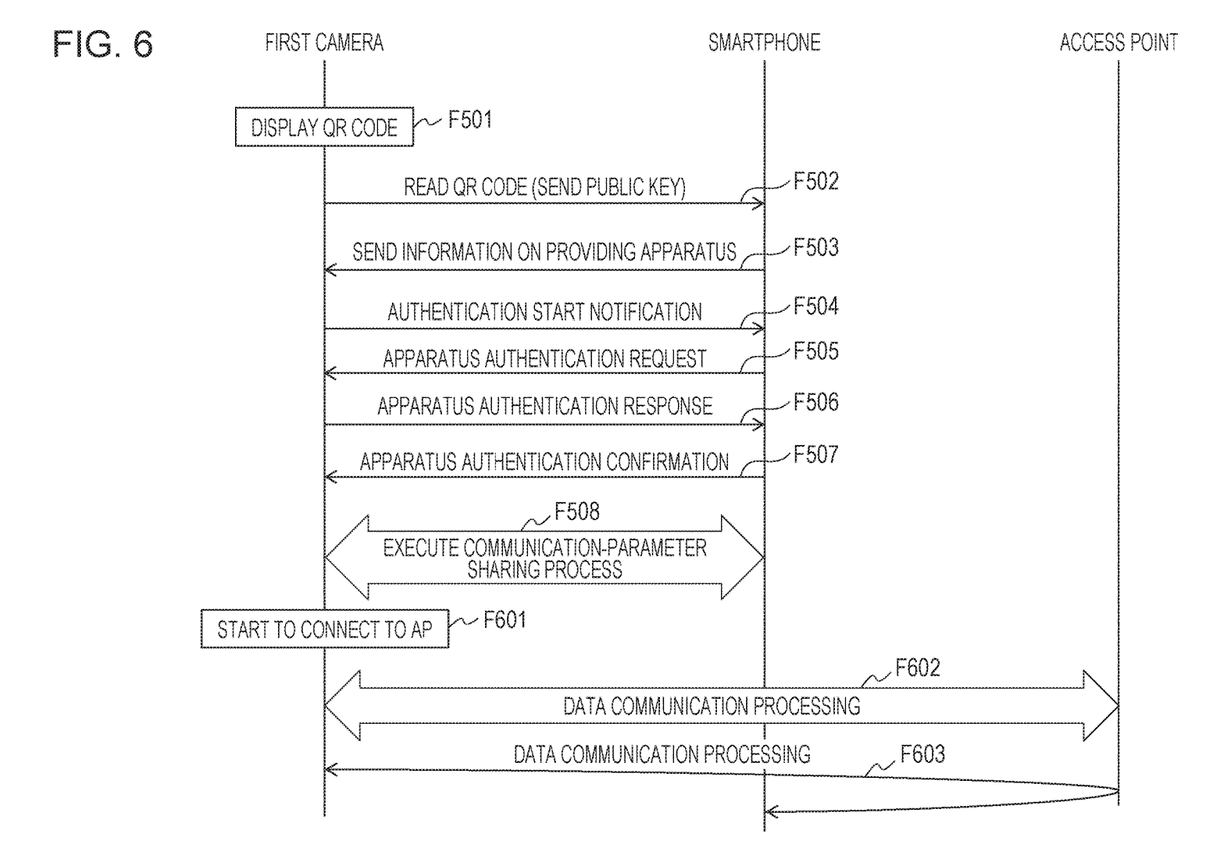
FIG. 6 is a flowchart illustrating a sequence for connecting communication apparatuses according to an embodiment of the present invention.

Referring next to FIG. 6, a sequence for connecting the first camera 32 to the wireless network 31 that the AP 34 establishes will be described.

In FIG. 6, the smartphone 33 provides information for connecting the first camera 32 to the wireless network 31 to the first camera 32.

The first camera 32 displays a QR Code® containing information necessary for setting the communication parameters on the display unit 105 of the first camera 32 according to a user operation. When the first camera 32 is instructed by the user to set communication parameters, the first camera 32 displays a QR Code® containing information necessary for setting the communication parameters on the display unit 105 (F501).

The information necessary for setting communication parameters is identification information unique to the first camera 32. The identification information is a public key or a certificate for use in encryption to share the communication parameters. The identification information can be a MAC address or UUID that uniquely identifies a network device. The information necessary for setting the communication parameters can include an identifier indicating that the apparatus is a receiving apparatus that receives the communication parameters. The information necessary for setting the communication parameters can include identification information, such as a one type password using a QR Code®.

The smartphone 33 reads the QR Code® displayed on the first camera 32 using the image capturing unit 106 of the smartphone 33 (F502). The smartphone 33 decodes the read QR Code® to acquire information that the QR Code® indicates. The smartphone 33 determines whether the information acquired from the QR Code® is information necessary for setting the communication parameters.

The smartphone 33 that has acquired the public key or the like of the first camera 32 serves as a communication-parameter providing apparatus and transmits a notification signal containing information corresponding to the identification information on the first camera 32 to the first camera 32 together with information on the smartphone 33 (F503). An example of the information corresponding to the identification information on the first camera 32 is a hash value of the identification information, such as the public key of the first camera 32.

The first camera 32 that has acquired the information on the smartphone 33, which is a communication parameter providing apparatus, starts an apparatus authentication process. The first camera 32 transmits a start request signal for starting the authentication process to the smartphone 33 (F504).

In response to receiving the apparatus-authentication start request signal from the first camera 32, the smartphone 33 transmits an apparatus-authentication request signal to the first camera 32 (F505).

Upon receiving the apparatus-authentication request signal, the first camera 32 returns an apparatus-authentication response signal to the smartphone 33 (F506). Upon receiving the apparatus-authentication response signal, if authentication is completed, the smartphone 33 returns an apparatus-authentication confirmation signal to the first camera 32 (F507). For the apparatus authentication executed from F505 to F507, a challenge response method is employed. This is provided for mere illustration purposes, and another authentication method can be employed.

Then, a communication-parameter sharing process is executed between the first camera 32 and the smartphone 33 (F508). The communication-parameter sharing process at F508 is based on WPS developed by Wi-Fi Alliance®. The communication-parameter sharing process can be based on, not the WPS, but Wi-Fi Direct® or AOSS. In this case, the communication parameters are provided from the smartphone 33 to the first camera 32.

Then, the first camera 32 starts to connect to the AP 34 using the provided communication parameters (F601). Upon completion of the connecting process, the first camera 32 can communicates with the AP 34 wirelessly (F602). This enables the first camera 32 to communicate with the smartphone 33 wirelessly via the AP 34 (F603).

The first camera 32 can connect to the wireless network 31 that the AP 34 establishes according to the above connection sequence. For apparatus authentication, an example is described in which the first camera 32 transmits an apparatus-authentication start notification to request the smartphone 33 to submit an apparatus authentication request. This is provided for mere illustration purposes, and F503 and F504 can be omitted, and the smartphone 33 can transmit the apparatus authentication request to the first camera 32 immediately after reading the QR Code®.

The second camera 35 can also connect to the wireless network 31 that the AP 34 establishes, as the first camera 32 does.

Thus, the first camera 32 and the second camera 35 can connect to the wireless network 31 of the AP 34 according to the above connection sequence, so that mutual data communication can be executed via the AP 34.

Figure 4:
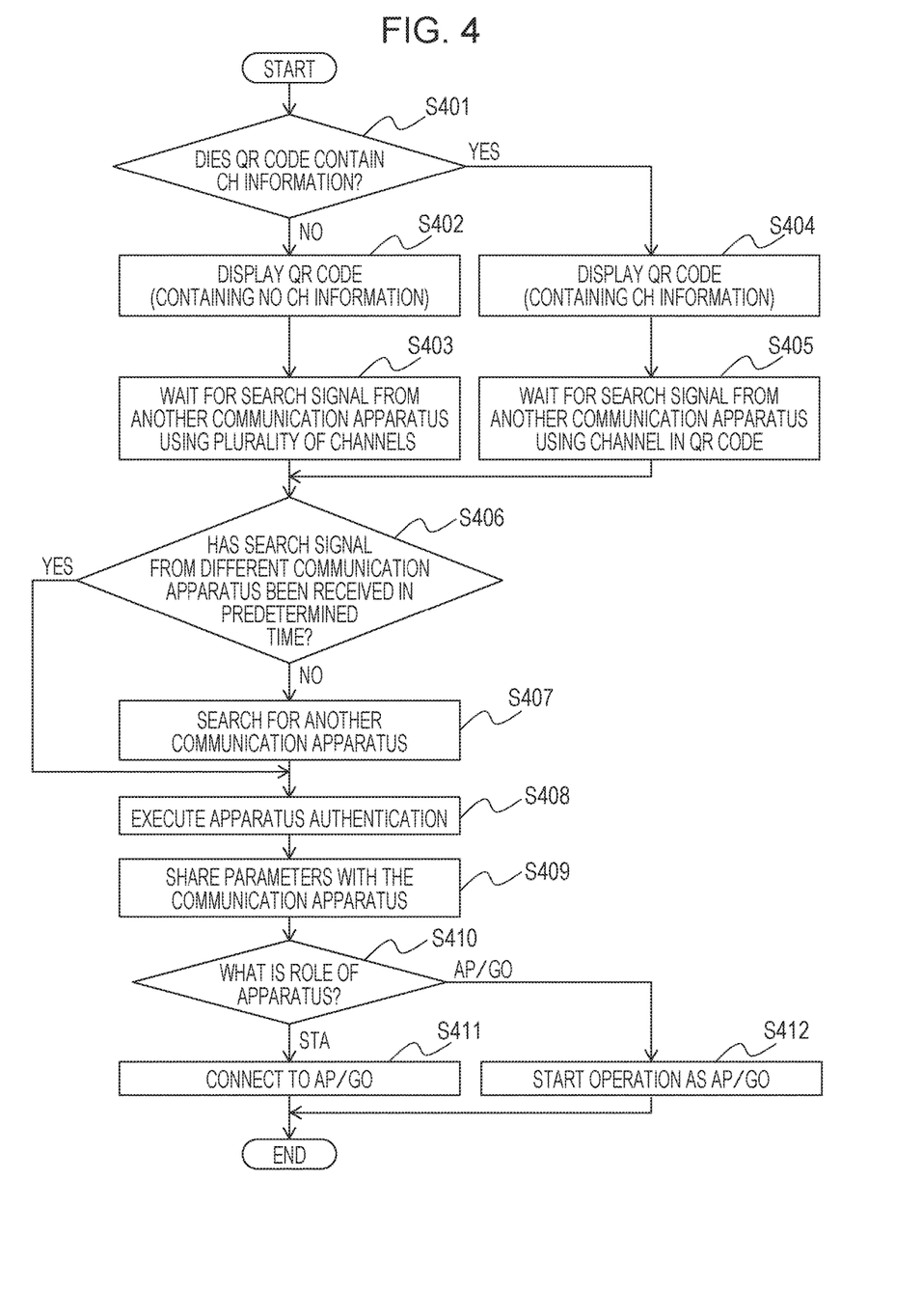
FIG. 4 is a flowchart illustrating the operation executed by a communication apparatus according to an embodiment of the present invention.

Referring next to FIG. 4, the process executed by the AP 34 in FIG. 5 and the process executed by the first camera 32 in FIG. 6 will be described. FIG. 4 is a flowchart illustrating the operation executed by the communication apparatus 101 (the AP 34 or the first camera 32). The steps in the flowchart are implemented by the control unit 102 reading and executing the control program stored in the storage unit 103.

The process in the flowchart is executed when the communication apparatus 101 intends to share communication parameters with a different communication apparatus 101. In this case, the different communication apparatus 101 is the smartphone 33 in FIGS. 5 and 6. The flowchart is executed when an instruction to start a communication-parameter setting process is submitted by user operation. This is not intended to limit aspects of the invention. The operation in FIG. 4 can be periodically repeated. In this case, the operation can be repeated at fixed intervals or at random.

When the communication-parameter setting process is started, the communication apparatus 101 determines whether the QR Code® contains information on a frequency channel (CH) (S401). The QR Code® contains no CH information in the case where, the information on the QR Code® cannot be changed, for example, in the case where the QR Code® is attached to an instruction manual or the casing of the communication apparatus 101. If CH has not been set in advance by the user, it can be determined that the QR Code® does not contain CH information even if the QR Code® is to be displayed on the display unit 105.

In contrast, the QR Code® contains no CH information in the case where predetermined CH has been set in advance by the user. If the communication apparatus 101 has checked surrounding radio wave situation in advance and has found CH in which radio waves are least used, it can be determined that the QR Code® contains information on the found CH.

If it is determined that the QR Code® does not contain CH information (No at S401), the communication apparatus 101 displays the QR Code® containing no CH information on the display unit 105 (S402). If the QR Code® is attached to an instruction manual or the communication apparatus 101, this step can be omitted.

Then, the communication apparatus 101 waits for a providing-apparatus information notification (F503) or a search signal, such as an apparatus-authentication request signal (F505), from a different communication apparatus 101 using a plurality of channels (S403). The plurality of channels are Channels 1 to 13 allocated to the 2.4 GHz band in the IEEE 802.11 series. The channels are not limited to such continuous channels; for example, discontinuous channels, such as Channels 1, 6, and 11.

In contrast, if it is determined that the QR Code® contains CH information (Yes at S401), the communication apparatus 101 displays the QR Code® containing CH information on the display unit 105 (S404). The communication apparatus 101 waits for the providing-apparatus information notification (F503) or a search signal, such as the apparatus-authentication request signal (F505), from a different communication apparatus 101 using the channel corresponding to the CH information contained in the QR Code® (S405). At that time, the communication apparatus 101 waits for the search request signal only over a predetermined CH, not a plurality of channels, as at S403. This increases the possibility that a search request signal from a different communication apparatus 101 can be received more quickly.

Thereafter, the communication apparatus 101 determines whether a search signal has been received in a predetermined time (S406). If not, (No at S406), the communication apparatus 101 transmits a search signal for searching for another communication apparatus 101 (S407). In this case, the search signal is the authentication start notification signal (F504). The communication apparatus 101 transmits the authentication start notification signal over a plurality of channels (Channels 1 to 13) allocated to the 2.4 GHz band in the IEEE 802.11 series.

If the QR Code® contains CH information, the authentication start notification signal can be transmitted only to the corresponding channel. The authentication start notification signal can be transmitted to not all of Channels 1 to 13 but discontinuous channels, such as Channels 1, 6, and 11.

Thereafter, the communication apparatus 101 performs an apparatus authentication process with the different communication apparatus 101 (S408). In this case, the communication apparatus 101 performs an apparatus authentication process based on a challenge-response method. Upon completion of the authentication, the communication apparatus 101 executes a process for sharing the communication parameters with the different communication apparatus 101 (S409). In this case, the communication apparatus 101 communicates communication parameters encrypted using an encryption key, which is shared in advance using a public key, to share the communication parameters with the different communication apparatus 101. This is provided for mere illustration purposes. In some embodiments, the communication apparatus 101 receives the communication parameters from the different communication apparatus 101 according to the procedure of WPS. Here, the communication parameters have been encoded using a key generated on the basis of a public key contained in the QR Code® displayed by the communication apparatus 101. This allows the communication parameters to be shared without leaking to the third person.

After sharing the communication parameters, the communication apparatus 101 determines the kind of operation of the communication apparatus 101 (S410). If the communication apparatus 101 operates as AP or GO in Wi-Fi Direct®, the communication apparatus 101 transmits a beacon and waits for connection from a STA or a client (CL) (S412). In contrast, if the communication apparatus 101 operates as STA or a client in Wi-Fi Direct®, the communication apparatus 101 searches for AP or GO and connects to the AP or GO (S411).

Thus, this embodiment enables a camera to join, as STA, a wireless network established by an AP by the simple operation of photographing a QR Code® displayed on a smartphone or the camera. This enhances user convenience.

In particular, if the QR Code® contains CH information, a communication apparatus and a different communication apparatus perform the searching process over a single channel without shifting to a plurality of channels, thus reducing the time taken for the searching process.

Since control for channel shift in the searching process is changed according to whether the QR Code® contains CH information, an appropriate searching process can be performed in any cases. To enable a plurality of cameras to join a wireless network that an AP forms, it is only required that images of QR Codes® displayed on the plurality of cameras are taken in sequence by using smartphone, thus enhancing user convenience.

The QR Codes® of the plurality of cameras can be photographed by a smartphone at different times, or alternatively, at the same time. In the former case, information on a first camera is acquired by photographing the QR Code® displayed on the first camera, and information on a second camera is acquired by photographing a QR Code® displayed on the second camera. That is, information on the individual cameras can be acquired from the individual photographed images.

In the latter case, the user places the plurality of cameras, with their QR Codes® displayed thereon, and photographs the QR Codes® with a smartphone in such a manner that the plurality of QR Codes® are photographed by one shooting. This allows the plurality of QR Codes® contained in an image captured by the smartphone to be individually analyzed, thus allowing information regarding the individual cameras to be acquired. That is, information on the individual cameras is acquired from the captured single image.

Another method for acquiring information on a plurality of cameras by photographing a QR Code® is creating one QR Code® containing information on the plurality of cameras and reading the QR Code® using a smartphone to acquire information on the plurality of cameras at one time. In this case, the information is shared in advance among the cameras using any method, and one of the cameras creates a QR Code® containing information on the other cameras. In some embodiments, the user designates other apparatuses (for example, cameras) whose information is to be contained in the QR Code® of any camera. The camera to which the user designation is input acquires the information from the designated other apparatuses and create a QR Code® containing the acquired information and information on the apparatus. Using such methods allows the smartphone to acquire information on a plurality of cameras by one photographing, further reducing the workload of the user.

The QR Code® to be read is not limited to a QR Code® displayed on a display unit, but can also be a QR Code® attached to the casing of a communication apparatus in the form of a seal or a QR Code® written directly on the casing. Other examples include, but are not limited to, a QR Code® attached in the form of a seal to an instruction manual of a communication apparatus or to an item associated with a communication apparatus, such as a package including a corrugated box used as a package at the time of delivery, or a QR Code® written directly on the package. In addition to a QR Code®, a one-dimensional barcode or a two-dimensional code different from a QR Code® can be used. User-readable information can also be used instead of machine-readable information such as a QR Code®.

In this embodiment, a communication apparatus notifies another apparatus of channel information in advance and waits to receive a predetermined signal when sharing communication parameters using the channel. This reduces the time taken to share the communication parameters.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer can comprise one or more processors (e.g., central processing unit (CPU), micro processing unit (MPU)) and can include a network of separate computers or separate processors to read out and execute the computer executable instructions. The computer executable instructions can be provided to the computer, for example, from a network or the storage medium. The storage medium can include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-144397, filed Jul. 21, 2015, which is hereby incorporated by reference herein in its entirety.

What is claimed is:

1. A communication apparatus comprising:
   one or more processors; and
   one or more memories including instructions that, when executed by the processor(s), cause the communication apparatus to:
      provide first information containing information unique to the communication apparatus and information on a predetermined channel for use in sharing a communication parameter for wireless communication with another communication apparatus or second information containing the information unique to the communication apparatus but not containing information on the predetermined channel;
      i) in a case where the first information is provided, wait to receive a predetermined signal containing information corresponding to the information unique to the communication apparatus without shifting from the predetermined channel to another channel;
      ii) wait, using a plurality of channels, to receive the predetermined signal in a case where the second information is provided; and
      in a case where the predetermined signal is received from the other communication apparatus, perform a process for sharing the communication parameter with the other communication apparatus.

2. The communication apparatus according to claim 1, wherein the communication apparatus provides the first information to the other communication apparatus via a code, wherein the code is displayed on a display unit.

3. The communication apparatus according to claim 1, wherein the communication apparatus provides the second information to the other communication apparatus via a code, wherein the code is displayed on a display unit.

4. The communication apparatus according to claim 1, wherein the communication apparatus provides the first information or the second information to the other communication apparatus using communication based on Bluetooth or near-field communication.

5. The communication apparatus according to claim 1, wherein the communication apparatus provides the first information via a code, wherein the code is located on the communication apparatus or an item associated with the communication apparatus.

6. The communication apparatus according to claim 1, wherein the communication apparatus provides the second information via a code, wherein the code is located on the communication apparatus or an item associated with the communication apparatus.

7. The communication apparatus according to claim 1, wherein at least one of the first information or the second information contains encoded information of the information unique to the communication apparatus.

8. The communication apparatus according to claim 1, wherein the information unique to the communication apparatus includes one of a public key of the communication apparatus, a MAC address of the communication apparatus, or a universally unique identifier of the communication apparatus.

9. The communication apparatus according to claim 1, wherein the communication apparatus waits a predetermined time for the predetermined signal.

10. The communication apparatus according to claim 9, wherein, when the predetermined time elapses and the communication apparatus has not received the predetermined signal from the other communication apparatus, the communication apparatus waits for the predetermined signal from the other communication apparatus using a plurality of channels even if the predetermined information contains the information on the predetermined channel.

11. The communication apparatus according to claim 1, wherein the communication apparatus shares the communication parameter with the other communication apparatus by acquiring the communication parameter from the other communication apparatus.

12. The communication apparatus according to claim 1, wherein the communication apparatus determines whether to provide the first information or the second information, and
   wherein, if the communication apparatus determines to provide the first information, the communication apparatus provides the first information and the communication apparatus does not provide the second information.

13. The communication apparatus according to claim 1, wherein the communication apparatus determines whether to provide the first information or the second information, and
   wherein, if the communication apparatus determines to provide the second information, the communication apparatus provides the second information and the communication apparatus does not provide the first information.

14. The communication apparatus according to claim 1, wherein the channel comprises a frequency channel.

15. The communication apparatus according to claim 1, wherein the communication parameter includes at least one of information on an encryption method, an encryption key, an authentication method, or an authentication key for wireless communication.

16. The communication apparatus according to claim 1, wherein the communication apparatus performs wireless communication based on an IEEE 802.11 series with the other communication apparatus using the communication parameter.

17. A method for sharing a communication parameter for wireless communication among a plurality of communication apparatuses, the method comprising:
- providing a notification of first information containing information unique to a communication apparatus and information on a predetermined channel for use in sharing a communication parameter for wireless communication with a other communication apparatus;
- providing a notification of second information containing the information unique to the communication apparatus but not containing information on the predetermined channel;
- waiting to, when the first information is provided, receive a predetermined signal containing information corresponding to the information unique to the communication apparatus without shifting from the predetermined channel to another channel;
- waiting to, when the second information is provided, receive the predetermined signal from the other communication apparatus using a plurality of channels; and
- performing, when the predetermined signal is provided from the other communication apparatus, a process for sharing the communication parameter with the other communication apparatus.

18. A non-transitory computer-readable storage medium storing computer-executable instructions for causing a computer to execute a method for sharing a communication parameter for wireless communication among a plurality of communication apparatuses, the method comprising:
- providing a notification of first information containing information unique to a communication apparatus and information on a predetermined channel for use in sharing a communication parameter for wireless communication with a other communication apparatus;
- providing a notification of second information containing the information unique to the communication apparatus but not containing information on the predetermined channel;
- waiting to, when the first information is provided, receive a predetermined signal containing information corresponding to the information unique to the communication apparatus without shifting from the predetermined channel to another channel;
- waiting to, when the second information is provided, receive the predetermined signal from the other communication apparatus using a plurality of channels; and
- performing, when the predetermined signal is provided from the other communication apparatus, a process for sharing the communication parameter with the other communication apparatus.

\* \* \* \* \*